(12) United States Patent
MacDonald et al.

(10) Patent No.: US 11,970,970 B2
(45) Date of Patent: Apr. 30, 2024

(54) ADJUSTABLE PRIMARY AND SUPPLEMENTAL POWER UNITS

(71) Applicant: RAYTHEON TECHNOLOGIES CORPORATION, Farmington, CT (US)

(72) Inventors: Malcolm P. MacDonald, Bloomfield, CT (US); Stephen H. Taylor, East Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/109,441

(22) Filed: Feb. 14, 2023

(65) Prior Publication Data

US 2023/0313737 A1 Oct. 5, 2023

Related U.S. Application Data

(60) Provisional application No. 63/324,803, filed on Mar. 29, 2022.

(51) Int. Cl.
*F02C 6/18* (2006.01)
*B64D 27/10* (2006.01)
*B64D 33/08* (2006.01)

(52) U.S. Cl.
CPC .............. *F02C 6/18* (2013.01); *B64D 27/10* (2013.01); *B64D 33/08* (2013.01)

(58) Field of Classification Search
CPC ...... F02C 6/18; F02C 6/04; F02C 1/10; F02C 1/007; B64D 27/10; B64D 2027/026;
(Continued)

(56) References Cited

U.S. PATENT DOCUMENTS 7,634,915 B2 * 12/2009 Hoffmann ............... F01K 23/10
60/39.15
9,249,018 B2 2/2016 Gurin
(Continued)

FOREIGN PATENT DOCUMENTS

EP 3845742 A1 * 7/2021 ............. F01D 15/08
WO 2020242843 A1 12/2020

OTHER PUBLICATIONS

Thorbergsson Egill et al: "A Thermodynamic Analysis of Two Competing Mid-Sized Oxyfuel Combustion Combined Cycles", Journal of Energy, [Online] vol. 2016, Jan. 1, 2016 (Jan. 1, 2016), pp. 1-14, XP93064321, ISSN: 2356-735X, DOI: 10.1155/2016/2438431 Retrieved from the Internet: URL: https://downloads.hindawi.com/journals/jen/2016/2438431.pdf.
(Continued)

*Primary Examiner* — Alain Chau
(74) *Attorney, Agent, or Firm* — Carlson, Gaskey & Olds, P.C.

(57) ABSTRACT

A propulsion system for an aircraft includes a core flow path in communication with a compressor section, combustor section and a turbine section. A first bottoming cycle system includes a bottoming working fluid flow in thermal communication with a high energy exhaust gas flow that is generated by the core engine. The first bottoming cycle is configured to recover power from the high energy exhaust gas flow in a first engine operating condition and in a second engine operating condition. A second bottoming cycle system is configured to recover power from the high energy exhaust gas flow in the first engine operating condition and not to recover power in a second engine operating condition.

17 Claims, 3 Drawing Sheets

(58) Field of Classification Search
CPC ........ F01K 23/10; F01K 23/101; F01K 23/02; F01K 23/06
See application file for complete search history.

(56) References Cited

U.S. PATENT DOCUMENTS

| | | | |
|---|---|---|---|
| 9,885,283 B2 | 2/2018 | Vaisman et al. | |
| 9,982,629 B2 | 5/2018 | Armstrong et al. | |
| 10,072,574 B2 | 9/2018 | Stapp | |
| 10,101,092 B2* | 10/2018 | Stapp | F02C 1/10 |
| 10,458,364 B2 | 10/2019 | Armstrong et al. | |
| 10,815,874 B2* | 10/2020 | Zia | F02B 37/013 |
| 10,830,123 B2* | 11/2020 | Homison | F02B 37/013 |
| 10,851,704 B2* | 12/2020 | Homison | F02G 5/02 |
| 11,047,265 B1 | 6/2021 | Prabhudharwadkar et al. | |
| 11,225,905 B1 | 1/2022 | Holley et al. | |
| 11,230,948 B2 | 1/2022 | McAuliffe et al. | |
| 2007/0130957 A1* | 6/2007 | Hoffmann | F02C 6/18 60/39.15 |
| 2013/0318965 A1* | 12/2013 | Ekanayake | F02C 1/007 60/273 |
| 2016/0053638 A1* | 2/2016 | Stapp | F01K 13/02 60/671 |
| 2017/0254229 A1* | 9/2017 | Fletcher | F02C 1/105 |
| 2019/0195121 A1* | 6/2019 | Homison | F02C 6/12 |
| 2019/0195131 A1* | 6/2019 | Zia | F02B 37/10 |
| 2019/0249599 A1* | 8/2019 | Sen | F02C 3/04 |
| 2020/0191048 A1* | 6/2020 | Homison | F02B 37/20 |
| 2020/0370842 A1* | 11/2020 | Mook | F28D 9/04 |
| 2021/0199025 A1* | 7/2021 | Prabhudharwadkar | F02C 1/005 |
| 2021/0239041 A1* | 8/2021 | Spadacini | F02C 1/10 |
| 2021/0301729 A1 | 9/2021 | Staubach et al. | |
| 2021/0340884 A1 | 11/2021 | Macdonald et al. | |
| 2021/0340910 A1 | 11/2021 | MacDonald | |
| 2022/0298967 A1* | 9/2022 | Balandier | F02C 6/18 |

OTHER PUBLICATIONS

European Search Report for European Application No. 23154040.2 dated Jul. 28, 2023.

* cited by examiner

FIG.1

FIG.2 TAKE-OFF CONFIGURATION

FIG.3 CRUISE CONFIGURATION

ADJUSTABLE PRIMARY AND SUPPLEMENTAL POWER UNITS

CROSS-REFERENCE TO RELATED APPLICATION

The present disclosure claims priority to U.S. Provisional Application No. 63/324,803 filed Mar. 29, 2022.

STATEMENT REGARDING FEDERALLY SPONSORED RESEARCH OR DEVELOPMENT

This subject of this disclosure was made with government support under Contract No.: DE-AR0001342 awarded by the United States Department of Energy. The government therefore may have certain rights in the disclosed subject matter.

TECHNICAL FIELD

The present disclosure relates generally to a system for recovering waste heat in a gas turbine engine, and more specifically to a work recovery system utilizing a supercritical $CO_2$ cycle to recover work from excess heat.

BACKGROUND

A gas turbine engine typically mixes a carbon based fuel with air within a combustor where it is ignited to generate a high-energy exhaust gas flow. Improving engine operating efficiencies are driven by economic and environmental demands. Most engine inefficiencies are due to heat lost when the high-energy exhaust gas flow exits the turbine and vents to atmosphere. Capture of waste heat may increase overall engine operating efficiencies.

Turbine engine manufacturers continue to seek further improvements to engine performance including improvements to thermal, transfer and propulsive efficiencies.

SUMMARY

A propulsion system for an aircraft according to an exemplary embodiment of this disclosure, among other possible things includes at least one core engine that includes a core flow path in communication with a compressor section, combustor section and a turbine section. A high energy exhaust gas flow is produced in the combustor section and expanded through the turbine section to drive the compressor section. A first bottoming cycle system includes a bottoming working fluid flow in thermal communication with the high energy exhaust gas flow that is generated by the core engine. The first bottoming cycle is configured to recover power from the high energy exhaust gas flow in a first engine operating condition and in a second engine operating condition. A second bottoming cycle system includes the bottoming working fluid flow in thermal communication with the high energy exhaust gas flow. The second bottoming cycle system is configured to recover power from the high energy exhaust gas flow in the first engine operating condition and not to recover power in a second engine operating condition.

In a further embodiment of the foregoing, the propulsion system includes a controller that is configured to control operation of the second bottoming cycle in response to the first engine operating condition and the second operation condition.

In a further embodiment of any of the foregoing, the at least one core engine includes a first core engine and a second core engine and the first engine operating condition includes the first bottom cycle system in thermal communication with the high energy exhaust gas flow from the first core engine and the second bottoming cycle in thermal communication with the high energy exhaust gas flow from the second engine.

In a further embodiment of any of the foregoing, the second engine operating condition includes the first bottoming cycle system in thermal communication with high energy exhaust gas flow from both the first core engine and the second core engine and the second bottoming cycle system is not in thermal communication with either the first core engine or the second core engine.

In a further embodiment of any of the foregoing, each of the first the bottoming cycle system and the second bottom cycle system includes a bottoming compressor and a bottoming generator driven by a bottoming turbine.

In a further embodiment of any of the foregoing, the bottoming generator produces usable shaft power or electric power.

In a further embodiment of any of the foregoing, each of the first bottoming cycle system and the second bottoming cycle system include a recuperator that is configured to provide thermal communication between the bottoming working fluid flows of differing temperatures.

In a further embodiment of any of the foregoing, each of the first core engine and the optional second core engine includes an exhaust heat exchanger that is configured to provide thermal communication between the high energy exhaust gas flow and the bottoming working fluid flow.

In a further embodiment of any of the foregoing, the propulsion system includes a first valve assembly controlling bottoming working fluid flow to the bottoming turbine of the first bottoming cycle and the second bottoming cycle and a second valve assembly that is configured to control bottoming working fluid flow from the bottoming compressor of the first bottoming cycle and the second bottoming cycle.

In a further embodiment of any of the foregoing, each of the first bottoming cycle system and the second bottoming cycle system include a ram air heat exchanger, the ram air heat exchanger is configured to cool the bottoming working fluid flow.

In a further embodiment of any of the foregoing, the first engine operating condition includes a low-altitude condition.

In a further embodiment of any of the foregoing, the second engine operation condition includes a high-altitude condition.

In a further embodiment of any of the foregoing, in the first engine operating condition, the bottoming working fluid flow is heated in the engine heat exchanger and then expanded through the bottoming turbine to drive the bottoming compressor and the generator.

In a further embodiment of any of the foregoing, bottoming working fluid flow exhausted from the bottoming turbine is placed in thermal communication with a cooler bottoming working fluid flow within the recuperator, then communicated to the ram air heat exchanger for further cooling and subsequent pressurization in the bottoming compressor and then communicated back through the recuperator to the engine heat exchanger.

A method of operating a propulsion system according to an exemplary embodiment of this disclosure, among other possible things includes generating a high energy exhaust gas flow with at least one core engine that includes a core flow path through a compressor section, a combustor section and a turbine section. The high energy exhaust gas flow is produced in the combustor section and expanded through the turbine section to drive the compressor section. A first bottoming turbine is driven with thermal energy transferred from the high energy exhaust flow into a bottoming working fluid flow within a first bottoming cycle system to recover power from the high energy exhaust gas flow during operation in a first engine operating condition and during a second engine operating condition. A second bottoming turbine is driven with thermal energy transferred from the high energy exhaust gas flow into the bottoming working fluid flow within a second bottoming cycle system in thermal communication with the high energy exhaust gas flow during the first engine operating condition. The second bottoming cycle system is decoupled from thermal communication with the high energy exhaust gas flow during the second engine operating condition.

In a further embodiment of the foregoing, the method includes generating mechanical or electric power by driving a first bottoming shaft with the first bottoming turbine and driving a second bottoming shaft with the second bottoming turbine during the first engine operating condition.

In a further embodiment of any of the foregoing, the method includes operating a control valve to stop flow of the bottoming working fluid through the second bottoming turbine during the second engine operating condition.

In a further embodiment of any of the foregoing, the first engine operating condition includes a low-altitude operating condition and the second engine operating condition includes a high-altitude operating condition.

In a further embodiment of any of the foregoing, a controller operates at least one control valve to stop bottoming working fluid flow to the second bottoming cycle system in response to an indication that the high energy exhaust gas flow has less thermal energy than desired to operate both of the first bottoming turbine and the second bottoming turbine.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
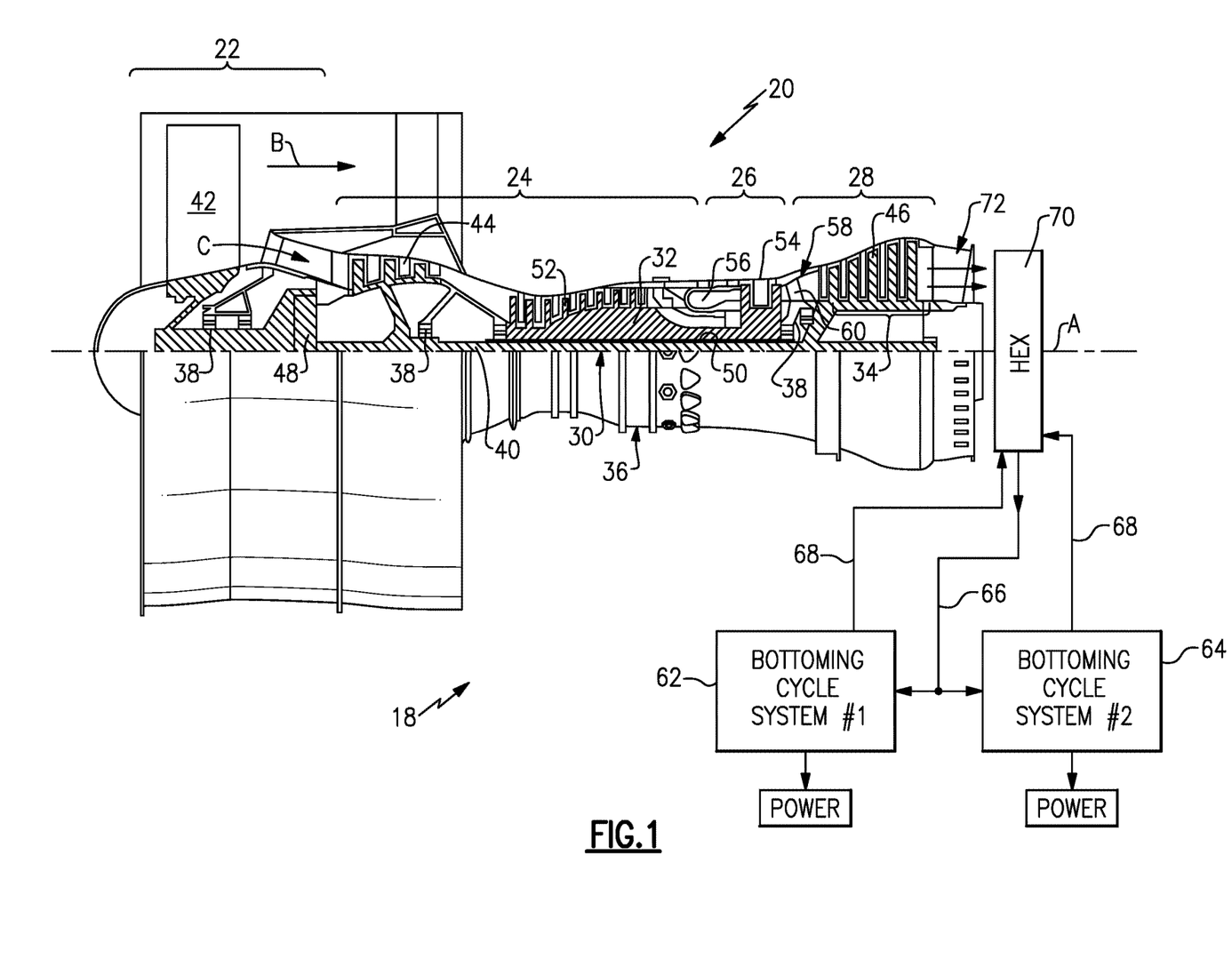
FIG. 1 schematically shows an example propulsion system embodiment.

FIG. 1 schematically illustrates an example propulsion system 18 that includes at least one gas turbine engine 20, a first bottoming cycle 62 and a second bottoming cycle 64 controlled to efficiently adapt waste heat power generation to operating conditions.

The example gas turbine engine 20 includes an optional fan section 22, a compressor section 24, a combustor section 26 and a turbine section 28. In embodiments where the engine does not directly drive a fan, the power produced may be used to drive any mechanical or electrical system of interest. If present, the fan section 22 drives air along a bypass flow path B. The compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive either the fan section 22, or other power consuming system, and the compressor section 24.

Although the disclosed non-limiting embodiment depicts a two-spool turbofan gas turbine engine, it should be understood that the concepts described herein are not limited to use with two-spool turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section. Moreover, the features and embodiments presented are applicable to land based turbine engines.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that provides shaft power to drive the fan section 22 or a power system generating system. In one disclosed example, the inner shaft 40 connects a low pressure (or first) compressor section 44 to a low pressure (or first) turbine section 46. The inner shaft 40 drives the fan section 22 through a speed change device, such as a geared architecture 48, to drive the fan 42 (or power system) at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment, the low fan pressure ratio is less than about 1.45.

"Low corrected fan tip speed" is the actual fan tip speed in ft/sec divided by an industry standard temperature correction of $[(Tram \; ° R)/(518.7° R)]^{0.5}$. The "Low corrected fan tip speed", as disclosed herein according to one non-limiting embodiment, is less than about 1150 ft/second.

For engine embodiments that include the fan section, the fan section 22 comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 6 turbine rotors schematically indicated at 34. In another non-limiting example embodiment, the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Thermal energy produced through the combustion process is wasted as the high energy exhaust gas flow is vented to atmosphere after expansion through the turbine section 28. The thermal energy vented to atmosphere can be used to drive other systems to produce electricity. The disclosed example propulsion system includes the first and second bottoming systems 62, 64 that utilizes a bottoming working fluid circulated through a heat exchanger 70 to accept thermal energy from the high energy exhaust gas flow 72. A cool bottoming working fluid 68 accepts thermal energy from the high energy exhaust gas flow 72 such that heated working fluid 66 is utilized by the bottoming systems 62, 64 to produce power.

The engine 20 uses inlet air as the working fluid and therefore naturally adapts to power output to air density. More power, and thus, more waste heat, is produced at lower altitudes with denser air than at higher altitudes with less dense air. The example bottoming cycles 62 and 64 are closed systems and therefore do not naturally adapt to operating conditions. The individual components must remain within a relatively narrow range of operating conditions in order to function as desired. Accordingly, the operability and efficiency of the two bottoming cycle systems 62 and 64 is significantly compromised at one condition or the other when designed for a particular rate of waste heat input. The example propulsion system 18 provides for adaptation of the bottoming cycle systems 62, 64 to engine operating conditions to maintain a desired operating efficiency.

Figure 2:
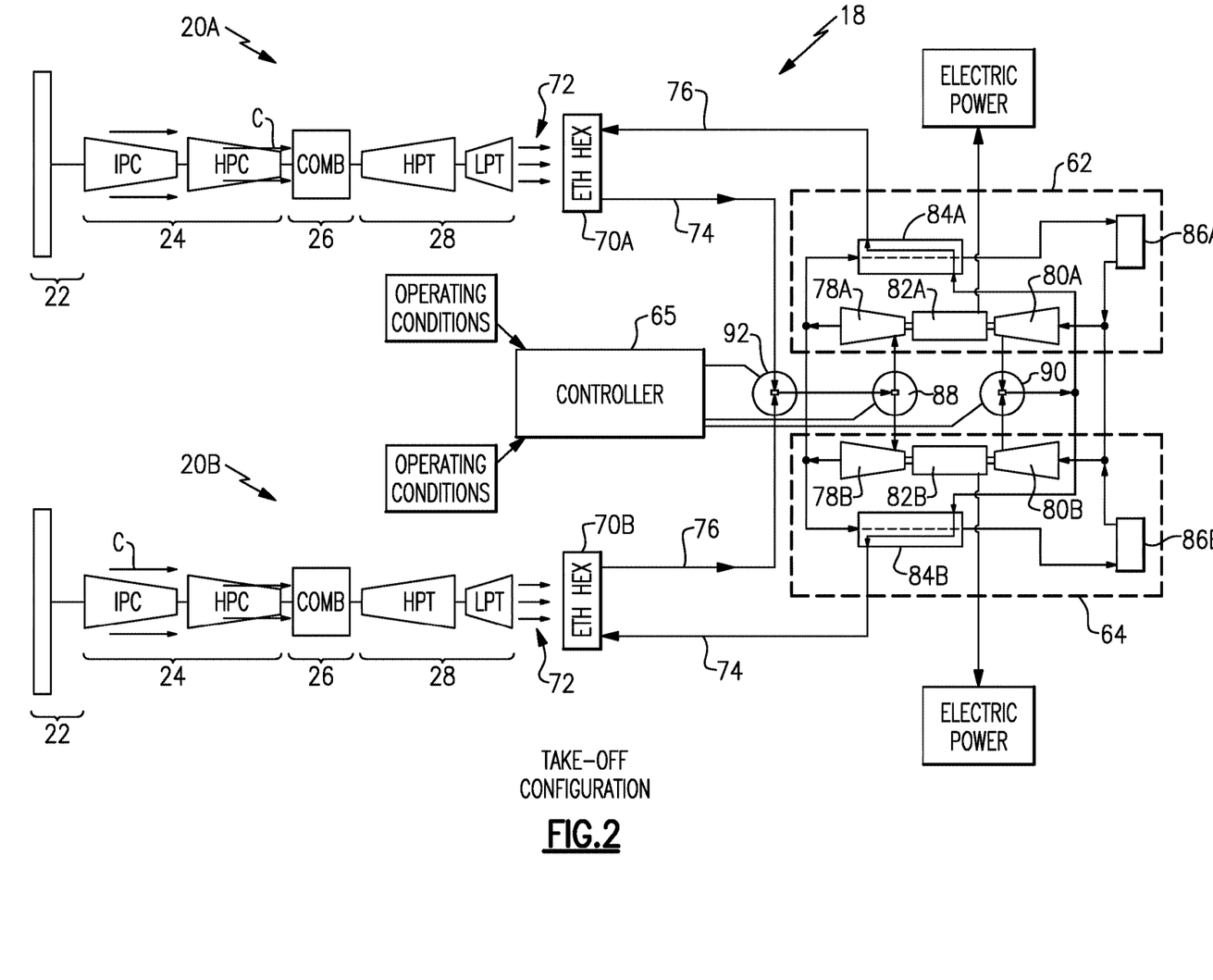
FIG. 2 schematically shows an example propulsion system in a first operating condition.

Referring to FIG. 2, the example propulsion system 18 includes first and second engine assemblies 20A and 20B that supply the first and second bottoming systems 62, 64. As appreciated, although two engine assemblies are disclosed by way of example, any number of engines 20 could be used including a single engine, four engines or any multiple of engines 20 within the contemplation of this disclosure. Moreover, although two bottoming cycle systems are shown and described by way of example, more than two bottoming cycle systems could effectively be implemented within the scope and contemplation of this disclosure. Additionally, although the disclosed first and second bottoming cycle systems 62, 64 are shown and described as identically configured and sized, differently configured and sized bottoming cycle systems could be utilized and combined to provide the desired power generating compacity.

The example first and second bottoming systems 62, 64 are a closed flow circuit of supercritical carbon dioxide (sCO2) bottoming working fluid that accepts thermal energy from the high energy exhaust gas flow 72 to produce a power output. In this disclosed example, the heated sCO2 working fluid flow 76 is expanded through a bottoming turbine 78A, 78B to generate shaft power used to drive a generator 82A, 82B and bottoming compressors 80A, 80B. The generators 82A, 82B produce electric power that can be used for functions of the aircraft and propulsion system. As appreciated, although the power recovered through expansion of the heated bottoming working fluid flow 76 through the turbines 78A-B are disclosed by way of example, other power recovering configurations are within the scope and contemplation of this disclosure.

The thermal energy available during engine operation differs depending on engine operating conditions. At lower altitudes, with denser warmer air, a sufficient amount of thermal energy is recoverable to operate both bottoming cycles at the optimal temperature entering turbines 78A-B, the optimal temperature entering compressors 80A-B, and the optimal flow rate for desired performance of both turbines 78A-B and compressors 80A-B. However, at higher altitudes, with thinner, air, the amount of thermal energy available for recapture may be less than desired to effectively operate both bottoming cycles. The example propulsion system 18 provides for adapting operation of the bottoming cycle systems 62, 64 to operate at least one of the bottoming cycles at the desires temperatures and flow rate.

In one disclosed embodiment, the architecture is used to adjust a mass flow rate of working fluid flow through the components such that the desired temperatures and flow rates are achieved through turbines 78A-B and compressors 80A-B.

The desired mass flow of working fluid flow is provided by decelerating the working fluid flow the system, such that the mass flow rate is at a desired level for a single turbine-compressor pair 78A and 80A, enabling these to remain operable and operate at or near desired efficiency.

The reduction in flow rate results in a reduction in working fluid flow rates arriving at the waste heat exchangers 70A and 70B, enabling the reduced quantity of waste heat available at each of these heat exchangers to raise the working fluid flow rate temperature near to that of the exhaust stream. Raising the working fluid flow temperature as much as possible in these heat exchangers raises the efficiency of heat to power conversion. The working fluid flows are then combined before expansion in the turbine 78A.

In the example embodiment, the flow is split again after turbine 78A to travel through recuperators 84A and 84B and heat rejection heat exchangers 86A and 86B. Subsequently, the working fluid flow is recombined for entry into compressor 80A, enabling this compressor to operate at its optimal flow rate for high efficiency. The non-power producing compressor-turbine pair 78B and 80B is then turned off until such time as sufficient thermal energy is available from the engines for both to operate at a desired efficiency. Note that in a similar embodiment, the working fluid flow in this operating condition is not split after the turbine 78A, thus directing the full flow through recuperator 84A and cooling heat exchanger 86A. Thus, recuperator 84B and cooling heat exchanger 86B may be inactivated in tandem with the compressor-turbine pair 78B and 80B.

In the illustrated example, the bottoming working fluid is maintained at or above a supercritical point during the heat addition and turbine expansion phases of the working cycle. Due to being maintained at or above the supercritical point, the bottoming cycle systems 62 and 64 are referred to as a supercritical CO2 cycle (sCO2 cycle). The bottoming working fluid may or may not be in a supercritical state during the heat rejection and compression phases of the cycle.

Each of the example bottoming cycle systems 62, 64 includes a corresponding bottoming turbine 78A, 78B that is coupled to a bottoming compressor 80A, 80B. The bottoming turbine 78A, 78B is coupled to drive a mechanical machine requiring shaft power, or an electric machine such as generator 82A and 82B to produce electric power.

A heat exchanger 70A, 70B are configured to transfer thermal energy from the exhaust gases 72 into the sCO2 working fluid flow 76. The heated sCO2 working fluid flow 76 is expanded through a corresponding bottoming turbine 78A, 78B to produce shaft power to drive corresponding generators 82A, 82B.

The bottoming working fluid flow 76 exhausted from the corresponding turbine 78A, 78B is directed through a corresponding recuperator 84A, 84B that is in thermal contact with a previously cooled portion of the bottoming working fluid flow. The recuperators 84A, 84B are heat exchangers that are configured to place different temperature bottoming working fluid flow into thermal contact for heating the CO2 flow from the compressors prior to further heating in exhaust heat exchangers 70A-B. The bottoming working fluid flow from the recuperator 84A, 84B is further cooled in a corresponding ram air heat exchanger 86A, 86B. From the ram air heat exchangers 86A, 86B, the bottoming working fluid flow is compressed in corresponding bottoming compressor 80A, 80B.

The bottoming turbine 78A, 78B may expand the bottoming working fluid flow below the critical pressure immediately prior to the beginning of the working fluid cycle. This expansion is referred to as overexpansion.

The compressed bottoming working fluid flow 74 from the compressor 80A, 80B is then routed through the recuperator 84A, 84B and back to the heat exchanger 70A, 70B to accept heat and begin the cycle over again.

During operation in the configuration illustrated in FIG. 2, both bottoming cycle systems 62, 64 operate continuously, and similarly to the degree that engines 20A and 20B are similar. In such operation, engines 20A and 20B are generating sufficient thermal energy to efficiently operate both bottoming cycle systems 62, 64.

The two bottoming cycle systems 62, 64 are coupled together by circuits that distribute bottoming working fluid flow. In this disclosed example, a first valve 88 splits the bottoming working fluid flow between the bottoming turbines 78A, 78B. A second valve 90 controls the mixing of bottoming working fluid flow exhausted from the compressors 80A, 80B. A third valve 92 controls the mixing of bottoming working fluid flow from the heat exchangers 70A, 70B. A controller 65 is provided to govern operation of the valves 88, 90 and 92 based in operating condition information received from the engines 20A, 20B as well as other sources of information present on an aircraft that are indictive of operation. The controller 65 uses the gathered information to actuate the appropriate control valves 88, 90, 92 to isolate one of the bottoming cycle systems 62, 64 to provide a desired efficiency.

FIG. 2 illustrates the propulsion system 18 in a take-off or low altitude configuration. In this disclosure, the low altitude is an altitude where an air density is such that the engine 20 generates an exhaust gas flow of a temperature above predefined desired temperature. In one example embodiment, the predefined desired temperature is that temperature that generates sufficient thermal energy to operate both bottoming cycles 62, 64 at a desired operating condition. Moreover, in this disclosure, one example take-off configuration refers to an air speed of about 0.25 Mach at sea level, with engines operating at or near full power and the highest allowable combustion temperature. In the take-off or low altitude configuration both the first and second bottoming cycle systems 62, 64 operate to reclaim thermal energy and produce power for use by the propulsion system 18 and/or aircraft systems. Both bottoming cycle systems 62, 64 are illustrated as producing electric power by way of driving the generators 82A, 82B with the shaft power generated by expanding the heated bottoming working fluid flow through each turbine 78A, 78B.

Figure 3:
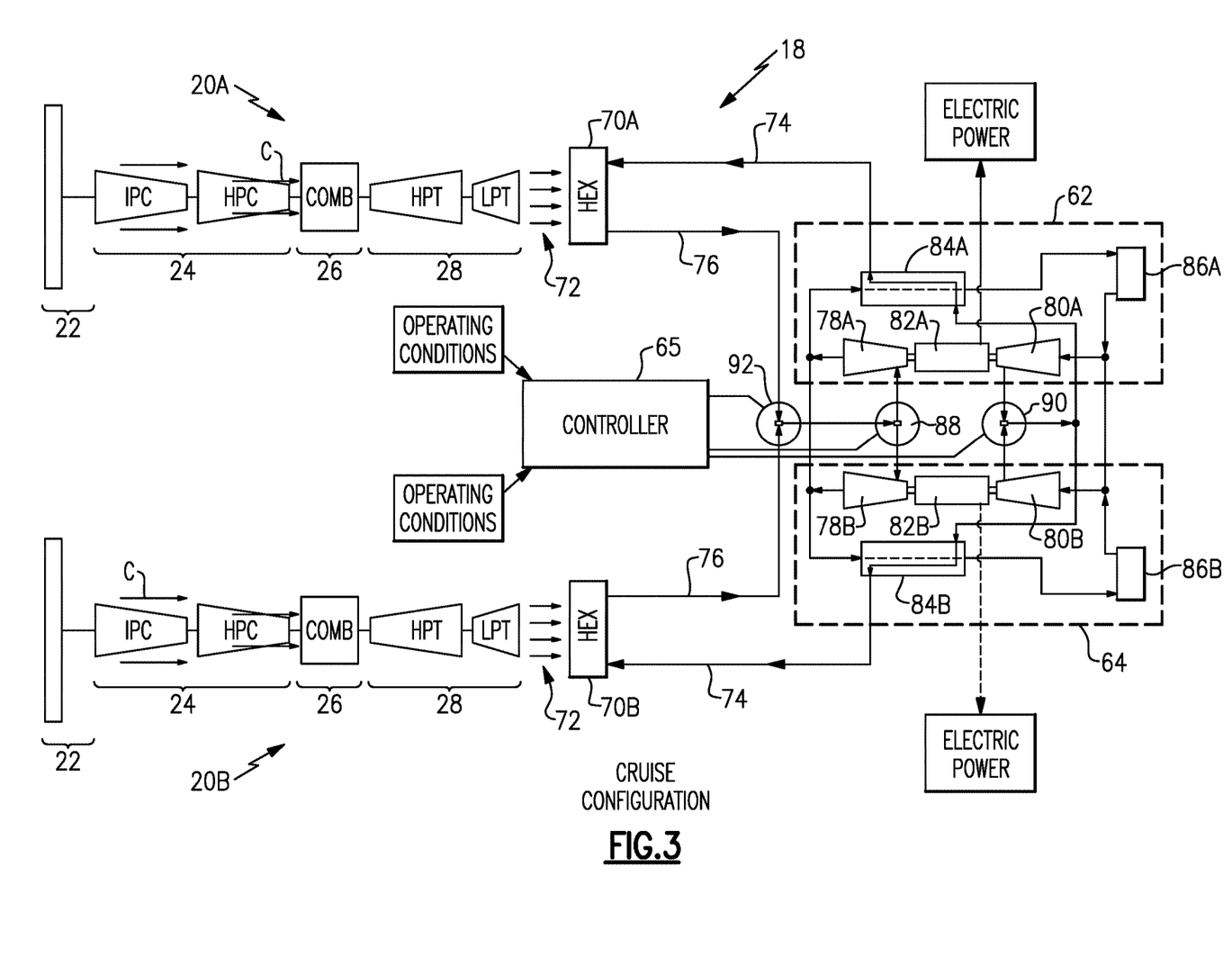
FIG. 3 schematically shows the example propulsion system in a second operating condition.

Referring to FIG. 3, the propulsion system 18 is configured for operation during cruise and/or high altitude conditions. In this disclosure, high altitude conditions are those conditions where the air density is below a predefined level that results in a reduced temperature and amount of thermal energy generated and exhausted as waste heat. The reduce amount of waste heat is that amount that is below the predefined level to support operation of both the first and second bottoming cycles 62, 64. In this disclosure cruise conditions refer to a condition that the engines 20A, 20B are designed to operate at a substantially steady state. One example cruise condition includes an air speed of about 0.8 Mach at about 35,000 feet where the engines 20A, 20B are operating at the best fuel consumption. At the example cruise altitude, the air is thin, the combustor temperature is reduced, and the engines 20A, 20B do not generate thermal energy sufficient to drive both bottoming cycle systems 62, 64 at desired efficiencies.

Accordingly, the controller 65 adapts operation by actuating the first valve 88 to direct the heated bottoming working fluid flow only to the bottoming turbine 78A of the first bottoming cycle system 62. The controller 65 further actuates the second valve 90 to close off flow to the bottoming compressor 80B of the second bottoming cycle system 64.

In the second operating condition configuration illustrated in FIG. 3, heated bottoming working fluid flow from both heat exchangers 70A and 70B are directed to the one bottoming turbine 78A. Thermal energy from both engines 20A and 20B is therefore combined to provide more thermal energy than would be available from each engine 20A, 20B alone at the second operating condition. The bottoming turbine 78A therefore provides electric power and operates at a desired efficiency. In this example, the desired efficiency is an efficiency that is greater than an efficiency achievable if both turbines 78A, 78B where operating and splitting the available thermal energy at the second engine operating condition The bottoming working fluid flows exhausted from the turbine 78A are routed through both recuperators 84A, 84B and ram heat exchangers 86A, 86B and back to respective exhaust gas heat exchangers 70A, 70B. The bottoming working fluid flows are routed only through the bottoming compressor 80A of the first bottoming cycle system 62. Operation continues according to the configuration illustrated in FIG. 3 until operating conditions change and the controller can actuate the first and second valves 88, 90 to reengage the dormant second bottoming cycle system 64.

The disclosed example propulsion system is adaptable to provide efficient and controlled waste heat power generation during varied operating conditions.

While described above in conjunction with a geared turbofan engine, it is appreciated that the waste heat recovery system described herein can be utilized in conjunction with any other type of turbine engine with only minor modifications that are achievable by one of skill in the art.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A propulsion system for an aircraft comprising;
    at least one core engine including a core flow path in communication with a compressor section, combustor section and a turbine section, wherein a high energy exhaust gas flow is produced in the combustor section and expanded through the turbine section to drive the compressor section;
    a first bottoming cycle system including a bottoming working fluid flow in thermal communication with the high energy exhaust gas flow generated by the core engine, the first bottoming cycle is configured to recover power from the high energy exhaust gas flow in a first engine operating condition and in a second engine operating condition;
    a second bottoming cycle system including the bottoming working fluid flow in thermal communication with the high energy exhaust gas flow, the second bottoming cycle system configured to recover power from the high energy exhaust gas flow in the first engine operating condition and not to recover power in the second engine operating condition;
    wherein each of the first bottoming cycle system and second bottoming cycle system includes a bottoming compressor driven by a bottoming turbine;
    a first valve assembly controlling bottoming working fluid flow to the bottoming turbine of the first bottoming cycle and the second bottoming cycle;
    a second valve assembly configured to control bottoming working fluid flow from the bottoming compressor of the first bottoming cycle and the second bottoming cycle; and
    a controller programmed and configured to operate one of the first valve assembly and the second valve assembly to stop bottoming working fluid flow to a corresponding one of the first bottoming cycle system and the second bottoming cycle system in response to an indication that the high energy exhaust gas flow has less thermal energy than desired to operate both of the first bottoming turbine and the second bottoming turbine.

2. The propulsion system as recited in claim 1, wherein the controller is further programmed and configured to control operation of the second bottoming cycle in response to the first engine operating condition and the second operation condition.

3. The propulsion system as recited in claim 1, wherein the at least one core engine comprises a first core engine and a second core engine and the first engine operating condition includes the first bottoming cycle system in thermal communication with the high energy exhaust gas flow from the first core engine and the second bottoming cycle in thermal communication with the high energy exhaust gas flow from the second engine.

4. The propulsion system as recited in claim 3, wherein in the second engine operating condition comprises the first bottoming cycle system in thermal communication with high energy exhaust gas flow from both the first core engine and the second core engine and the second bottoming cycle system not in thermal communication with either the first core engine or the second core engine.

5. The propulsion system as recited in claim 4, wherein each of the first bottoming cycle system and the second bottom cycle system further includes a a bottoming generator driven by the bottoming turbine.

6. The propulsion system as recited in claim 5, wherein the bottoming generator produces usable shaft power or electric power.

7. The propulsion system as recited in claim 5, wherein each of the first bottoming cycle system and the second bottoming cycle system include a recuperator configured to provide thermal communication between the bottoming working fluid flows of differing temperatures.

8. The propulsion system as recited in claim 5, wherein each of the first core engine and the second core engine includes an exhaust heat exchanger configured to provide thermal communication between the high energy exhaust gas flow and the bottoming working fluid flow.

9. The propulsion system as recited in claim 7, wherein each of the first bottoming cycle system and the second bottoming cycle system include a ram air heat exchanger, the ram air heat exchanger configured to cool the bottoming working fluid flow.

10. The propulsion system as recited in claim 1, wherein the first engine operating condition comprises a first altitude condition.

11. The propulsion system as recited in claim 10, wherein the second engine operation condition comprises a second altitude condition.

12. The propulsion system as recited in claim 9, wherein in the first engine operating condition, the bottoming working fluid flow is heated in an exhaust heat exchanger and then expanded through the bottoming turbine to drive the bottoming compressor and the generator in each of the first bottoming cycle system and the second bottoming cycle system.

13. The propulsion system as recited in claim 12, wherein bottoming working fluid flow exhausted from the bottoming turbine placed in thermal communication with a cooler bottoming working fluid flow within the recuperator, then communicated to the ram air heat exchanger for further cooling and subsequent pressurization in the bottoming compressor and then communicated back through the recuperator to the engine heat exchanger.

14. A method of operating a propulsion system comprising:
  generating a high energy exhaust gas flow with at least one core engine including a core flow path through a compressor section, a combustor section and a turbine section, wherein the high energy exhaust gas flow is produced in the combustor section and expanded through the turbine section to drive the compressor section;
  driving a first bottoming turbine with thermal energy transferred from the high energy exhaust flow into a bottoming working fluid flow within a first bottoming cycle system to recover power from the high energy exhaust gas flow during operation in a first engine operating condition and during a second engine operating condition; and
  driving a second bottoming turbine with thermal energy transferred from the high energy exhaust gas flow into the bottoming working fluid flow within a second bottoming cycle system in thermal communication with the high energy exhaust gas flow during the first engine operating condition; and
  decoupling the second bottoming cycle system from thermal communication with the high energy exhaust gas flow during the second engine operating condition, wherein a controller operates at least one control valve to stop bottoming working fluid flow to the second bottoming cycle system in response to an indication that the high energy exhaust gas flow has less thermal energy than desired to operate both of the first bottoming turbine and the second bottoming turbine.

15. The method as recited in claim 14, including generating mechanical or electric power by driving a first bottoming shaft with the first bottoming turbine and driving a second bottoming shaft with the second bottoming turbine during the first engine operating condition.

16. The method as recited in claim 15, including operating a control valve to stop flow of the bottoming working fluid through the second bottoming turbine during the second engine operating condition.

17. The method as recited in claim 14, wherein the first engine operating condition comprises a first altitude operating condition and the second engine operating condition comprises a second altitude operating condition.

* * * * *